(12) United States Patent
Toutant et al.

(10) Patent No.: US 7,938,604 B2
(45) Date of Patent: May 10, 2011

(54) ATTACHMENT MOUNTING DEVICE FOR UTILITY VEHICLE CARGO BOX

(75) Inventors: John T. Toutant, Waupun, WI (US); Terry L. Zwart, Breezy Point, MN (US)

(73) Assignee: Deere & Company, Moline, IL (US)

( * ) Notice: Subject to any disclaimer, the term of this patent is extended or adjusted under 35 U.S.C. 154(b) by 402 days.

(21) Appl. No.: 12/118,952

(22) Filed: May 12, 2008

(65) Prior Publication Data
US 2009/0279977 A1    Nov. 12, 2009

(51) Int. Cl.
*B60P 1/64* (2006.01)
(52) U.S. Cl. ......................................................... 410/77
(58) Field of Classification Search .................... 410/77, 410/78, 102, 130, 104; 296/100.7, 100.12, 296/100.15; *B60P 1/64*
See application file for complete search history.

(56) References Cited

U.S. PATENT DOCUMENTS

| | | | | |
|---|---|---|---|---|
| 5,443,341 | A | * | 8/1995 | Hamilton ...................... 410/116 |
| 5,560,576 | A | | 10/1996 | Cargill |
| 6,024,402 | A | | 2/2000 | Wheatley |
| 6,065,914 | A | * | 5/2000 | Fotou ................................ 410/3 |
| 6,604,898 | B2 | * | 8/2003 | Price ............................. 410/102 |
| 6,799,927 | B2 | * | 10/2004 | Wheatley ...................... 410/104 |
| 6,848,873 | B1 | * | 2/2005 | Husk ............................. 410/115 |
| 2005/0191118 | A1 | * | 9/2005 | Kay ................................ 403/48 |

\* cited by examiner

*Primary Examiner* — Glenn Dayoan
*Assistant Examiner* — SunSurraye Westbrook

(57) ABSTRACT

An attachment mounting device for a utility vehicle cargo box with a sidewall with a bar along a top edge and a recessed surface in the sidewall below the bar. The attachment mounting device has a head at an upper end, a hook at a lower end, and a mid-section therebetween. A handle is attached to a cam insert having a cam surface contacting the bar. The cam insert is slidable to move the cam insert around the bar to move the hook upward sufficiently to engage the recessed surface in the sidewall.

16 Claims, 3 Drawing Sheets

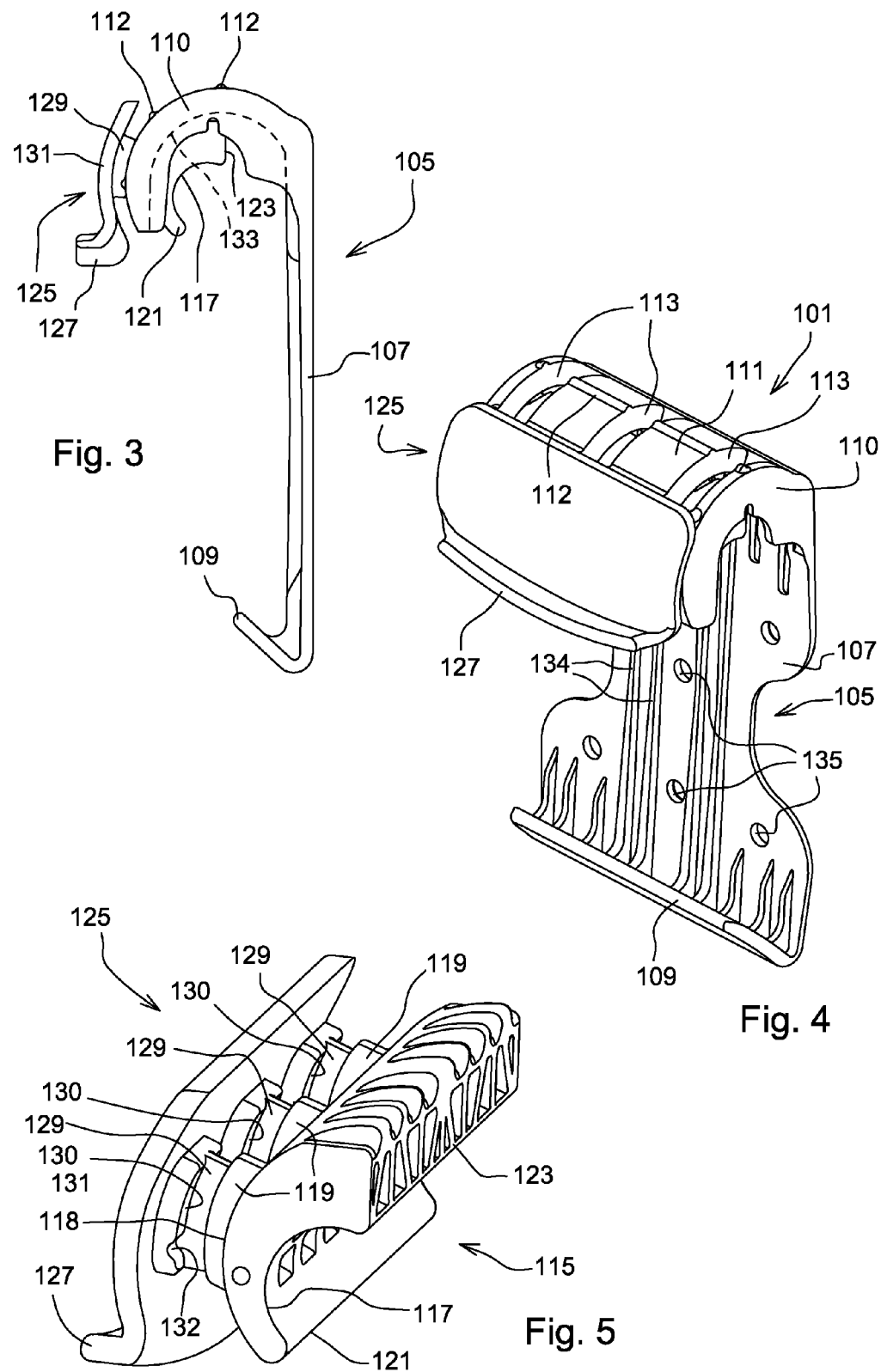

ATTACHMENT MOUNTING DEVICE FOR UTILITY VEHICLE CARGO BOX

FIELD OF THE INVENTION

This invention relates to cargo boxes for off-road utility vehicles used for agricultural, industrial or recreational purposes. More specifically, this invention relates to an attachment mounting device for a utility vehicle cargo box.

BACKGROUND OF THE INVENTION

Off-road utility vehicles are often equipped with cargo boxes for carrying various items including tools, supplies, or material. In the past, utility vehicle cargo boxes have been typically constructed of steel panels for sidewalls, with a supporting frame under the floor. Various attachments have been mounted to the steel sidewalls of a utility vehicle cargo box, including racks, tool boxes, load dividers, etc. The attachments can be mounted to the top of the steel sidewalls, for example, using a bolt-on method, or to holes drilled into each wall surface. Hardware and tools are required to mount the attachments to the cargo box wall. An attachment mounting device is needed that can be used to mount or relocate attachments on the utility vehicle cargo box without using tools.

Recently, efforts have been made to use composite materials, or other light weight materials such as blow-molded plastics that provide high strength and durability, for utility vehicle cargo boxes. Drilling holes into the sidewalls of a composite utility vehicle cargo box, however, will damage or destroy the sidewalls. It is desirable to mount attachments to a composite utility vehicle cargo box without damaging the sidewalls. Additionally, composite utility vehicle cargo boxes typically have manufacturing tolerances and are subject to thermal expansion. It is desirable to provide an attachment mounting device for a composite utility vehicle cargo box that will accommodate manufacturing tolerances and thermal expansion.

SUMMARY OF THE INVENTION

An attachment mounting device is provided for a utility vehicle cargo box with a sidewall having a bar on a top edge thereof and a recessed surface below the bar. The attachment mounting device has a head at a first end engaging the bar on the sidewall, and a hook at a second end. A cam insert is pivotable around the bar to move the hook between an unattached position in which the hook is disengaged from the recessed surface in the cargo box sidewall and a fully attached position in which the hook is engaged to the recessed surface in the sidewall.

The attachment mounting device can be used to mount or relocate attachments on the utility vehicle cargo box without using tools. The attachment mounting device will accommodate manufacturing tolerances and thermal expansion of a composite utility vehicle cargo box.

BRIEF DESCRIPTION OF THE DRAWINGS

FIG. 3 is a side view of an attachment mounting device for a utility vehicle cargo box in one embodiment of the invention.

FIG. 4 is a perspective view of a view of an attachment mounting device for a utility vehicle cargo box in one embodiment of the invention.

FIG. 5 is a perspective view of a handle and cam insert of the attachment mounting device of FIG. 4.

DESCRIPTION OF THE PREFERRED EMBODIMENT

Figure 1:
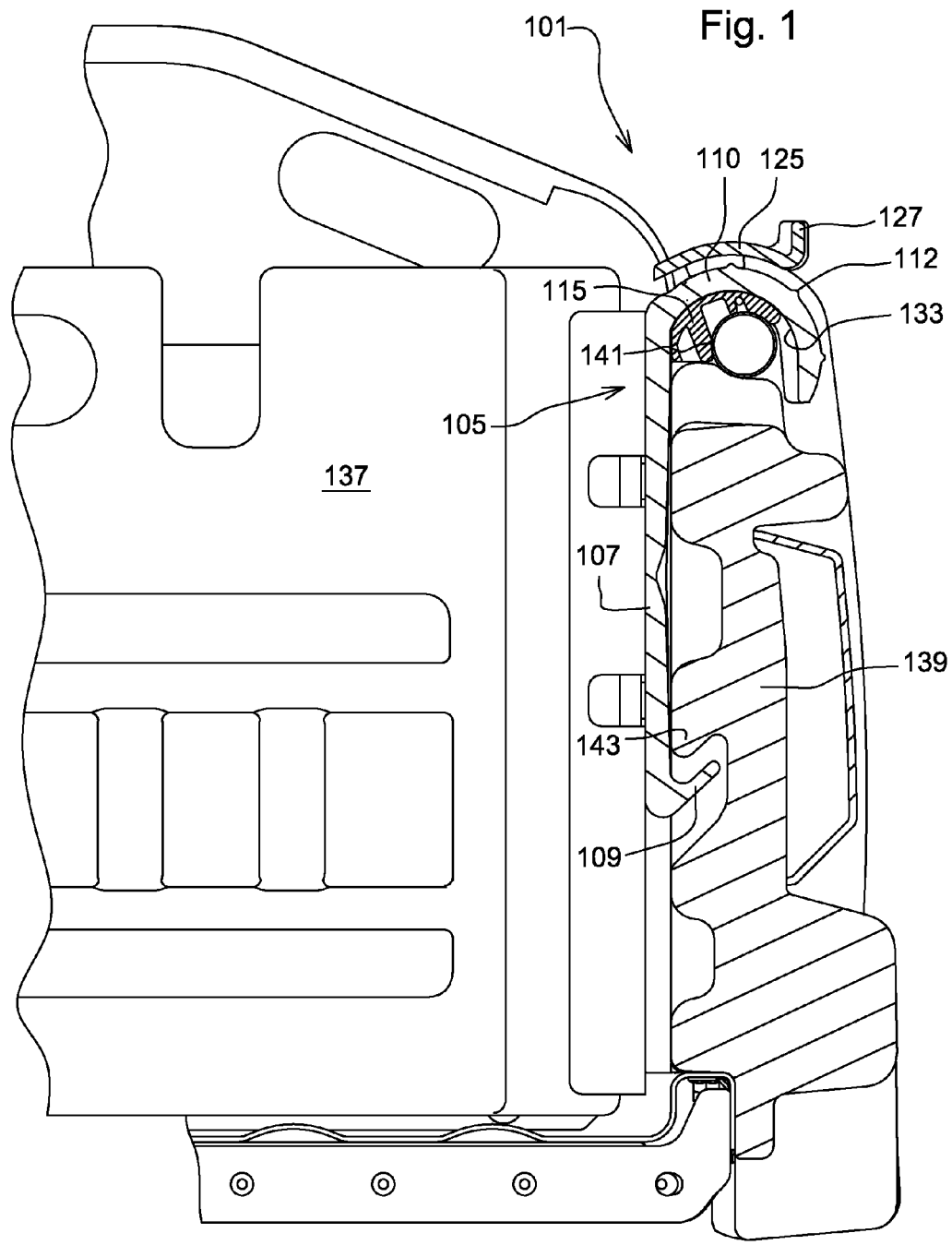
FIG. 1 is a side view in cross section of an attachment mounting device for a utility vehicle cargo box in an unattached position before full attachment according to a first embodiment of the invention.

In a first embodiment of the invention shown in FIGS. 1-5, attachment mounting device 101 includes J-hook 105, cam insert 115 and handle 125. The components of the attachment mounting device may be molded from a composite or plastic material. A utility vehicle cargo box may be provided with multiple attachment mounting devices. For example, a pair of attachment mounting devices on the opposing sidewalls of a cargo box may be used to secure attachments extending across the width of the cargo box.

In one embodiment, J-hook 105 is a vertically aligned component having a mid-section 107 between hook 109 at its lower end and head 110 at its upper end. Mid-section 107 may have a plurality of stiffening ribs 134, and a plurality of holes 135 where fasteners may be inserted to connect the J-hook to an attachment such as a rack, tool box, load divider, etc.

In one embodiment, head 110 may have a width of between about 2 inches and about 4 inches, an outer curved surface 111, and an inner curved surface 133 on which cam insert 115 slides. A plurality of slots 113 may extend between the outer and inner surfaces of the head. A plurality of engaging ribs 112 may be provided on the outer curved surface of the head and may be aligned transversely to the slots.

In one embodiment, cam insert 115 and handle 125 are secured or permanently fastened together. When these two components are fastened together, an operator may grip the handle to slide the cam insert to tighten or loosen the attachment to a utility vehicle cargo box without use of hand tools.

In FIG. 1, the attachment mounting device is shown in an unattached position, before it is fully attached to a sidewall of a utility vehicle cargo box. The head may be positioned over bar 141 on the top edge of the sidewall, and hook 109 may be located adjacent to but disengaged from recessed surface 143 in the sidewall below the bar.

In one embodiment, to fully attach the attachment mounting device to the sidewall, the operator pivots handle 125 so that first or lower cam surface 117 of cam insert 115 slides around bar 141, and second or upper cam surface 118 slides around the inner curved surface 133 of the J-hook head. As the cam insert starts to slide around the bar, the attachment mounting device pulls hook 109 upwardly to engage recessed surface 143 in the cargo box sidewall below the bar. As the cam insert continues to slide around bar 141, the attachment mounting device exerts compressive force between the bar and recessed surface 143 below the bar.

Figure 2:
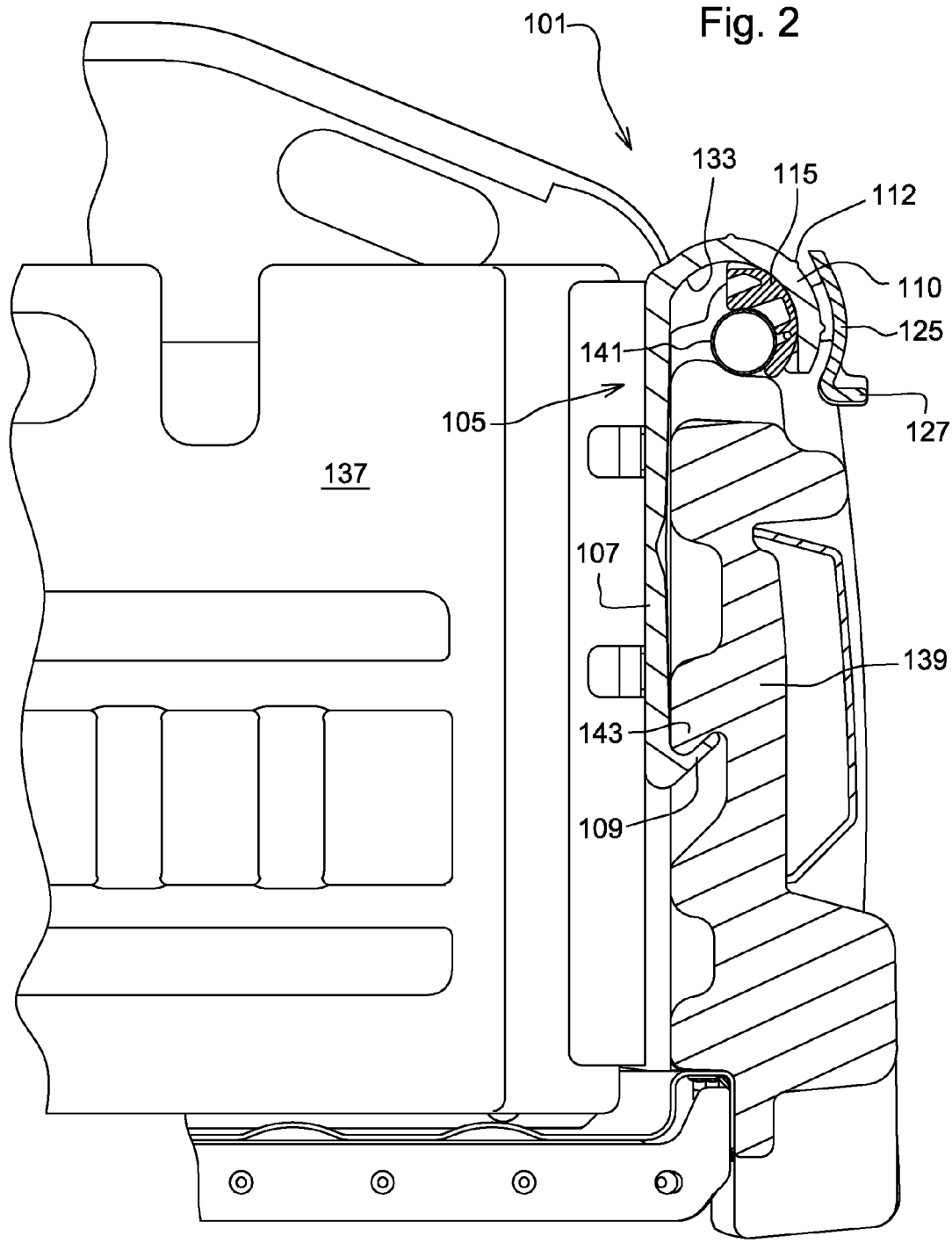
FIG. 2 is a side view in cross section of an attachment mounting device for a utility vehicle cargo box after full attachment according to a first embodiment of the invention.

In FIG. 2, the attachment mounting device is shown in a fully attached position. To loosen the attachment mounting device, the operator pivots the handle in the opposite direction so that the attachment mounting device exerts decreasing compressive force between bar 141 and recessed surface 143 below the bar. When the attachment mounting device is loosened completely, hook 109 disengages recessed surface 143.

In one embodiment, each of the cam insert and the handle may have a width of between about 2 inches and about 4 inches. The handle may have a face 131 with an outwardly facing lip 127 along an edge thereof. The cam insert and handle may be fastened together so that both components can pivot together along slots 113 in the head of the J-hook. For example, the cam insert may have a plurality of projections 119 with openings, and the handle may have a plurality of posts 129. Each of the posts and projections are positioned to extend through one of slots 113, and the posts may be inserted into and secured in the openings by a pin, adhesive or other attachment means.

In one embodiment, cam insert 115 has a first or lower curved cam surface 117 and a second or upper curved cam surface 118. The thickness between the first and second cam surfaces increases from a first end 121 to a second end 123 thereof. The first or lower curved cam surface contacts and slides around bar 141 on sidewall 139 of the utility vehicle cargo box, and the second or upper curved cam surface 118 contacts and slides along the inner curved surface 133 of the J-hook.

In one embodiment, the utility vehicle cargo box sidewall may have a plurality of recessed surfaces 143 that may be engaged by hook 109. Each recessed surface 143 may include a downwardly inclined ledge or shelf below the bar. These shelves or ledges may be molded into the sidewall, and may be securely engaged by hook 109 at the lower end of J-hook 105. The cargo box sidewall is preferably a composite material such as blow molded plastic, but alternatively may be steel or other material.

In one embodiment, an operator may position hook 109 directly in front of one of the inclined downwardly facing ledges 143 of the cargo box sidewall, and may position head 110 over bar 141 so that the first or lower curved cam surface 117 contacts the top of the bar. The second or upper curved cam surface 118 contacts the inner curved surface 133 of the head. The operator then pivots handle 125 to slide cam insert 115 so that an increasingly thicker portion of cam insert is between the bar and the inner curved surface 133 of the J-hook head. By pivoting the handle in this direction, the cam insert slides and pulls the attachment mounting device upwardly so that hook 109 moves up to engage shelf or ledge 143, and then the attachment mounting device exerts a compressive force between the bar and the recess in the sidewall.

In one embodiment, each of posts 129 extending from handle 125 has a shoulder 132 with a recess or detent 132. As the handle pivots along slots 113, and the J-hook is tightened or loosened, the detent 132 may catch one of the engaging ribs 112 on the outer surface of the J-hook head to help prevent loosening of the attachment.

In one embodiment, to remove the attachment 101, the operator pivots handle 125 to position an increasingly thinner portion of cam insert 115 between the bar and the inner curved surface 133 of the J-hook head. By pivoting the handle in this direction, the cam insert allows the attachment mounting device to move downwardly, loosening hook 109 from the downwardly facing ledge or shelf of the sidewall. The operator then may remove J-hook head 110 over bar 141 so that the cam insert 115 is no longer positioned over the bar. The operator then may pull back the J-hook to remove hook 109 from the recessed surface of the sidewall.

Having described a preferred embodiment, it will become apparent that various modifications can be made without departing from the scope of the invention as defined in the accompanying claims.

The invention claimed is:

1. An attachment mounting device for a utility vehicle cargo box sidewall comprising:
    a bar extending fore and aft on the cargo box sidewall;
    a one-piece molded plastic J-hook having a head at an upper end and a hook at a lower end and a mid-section therebetween; and
    a handle pivotable with respect to the head and attached to a cam insert having a cam surface engaging the bar on the cargo box sidewall and sliding around the bar to move the hook upward sufficiently to engage a recessed surface in the cargo box sidewall.

2. The attachment mounting device of claim 1 wherein the attachment mounting device exerts a compressive force between the bar and the recessed surface.

3. The attachment mounting device of claim 1 wherein the head has an inner curved surface.

4. The attachment mounting device of claim 3 wherein the cam insert has a first cam surface sliding on the bar and a second cam surface sliding on the inner curved surface of the head.

5. The attachment mounting device of claim 1 wherein the cargo box sidewall is a composite material.

6. The attachment mounting device of claim 1 further comprising a plurality of ribs on the head engaging the handle at a plurality of positions.

7. An attachment mounting device for a utility vehicle cargo box comprising:
    a one-piece plastic member having a head at a first end thereof engaging a bar extending fore and aft on a sidewall of the cargo box, and having a hook at a second end thereof; and
    a cam insert engaging the bar and pivotable around the bar to move the hook between an unattached position in which the hook is disengaged from a recessed surface in the cargo box sidewall and a fully attached position in which the hook is engaged to the recessed surface in the cargo box sidewall.

8. The attachment mounting device of claim 7 further comprising a pivotable handle attached to the cam insert.

9. The attachment mounting device of claim 8 further comprising a curved outer surface on the head.

10. The attachment mounting device of claim 9 further comprising a plurality of ridges on the curved outer surface of the head.

11. The attachment mounting device of claim 10 wherein the handle includes a recess engaging the ridges on the curved outer surface of the head.

12. The attachment mounting device of claim 7 wherein the head has an internal curved surface on which the cam insert slides.

13. An attachment mounting device for a utility vehicle cargo box comprising:
    a one-piece attachment mounting device engaging a bar extending fore and aft on a sidewall of the cargo box and engaging a recessed surface in the sidewall below the bar; and
    a cam engaging and sliding around the bar causing the attachment mounting device to exert a compressive force between the bar and the recessed surface for holding the attachment mounting device to the sidewall.

14. The attachment mounting device of claim 13 wherein the attachment mounting device includes a hook engaging the recessed surface in the sidewall.

15. The attachment mounting device of claim 13 further comprising a pivotable handle attached to the cam.

16. The attachment mounting device of claim 13 wherein the cam has a first cam surface contacting the bar and a second cam surface contacting a curved surface in the attachment mounting device.

* * * * *